(12) United States Patent
Bielas et al.

(10) Patent No.: US 10,715,781 B1
(45) Date of Patent: Jul. 14, 2020

(54) MULTIPLE KILL VEHICLE (MKV) INTERCEPTOR WITH IMPROVED PRE-EJECTION ACQUISITION AND DISCRIMINATION

(71) Applicant: Raytheon Company, Waltham, MA (US)

(72) Inventors: Michael S. Bielas, Tucson, AZ (US); Paul H. Oglesby, Oro Valley, AZ (US); Richard A. Paiva, Tucson, AZ (US); Thomas M. Crawford, Marana, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/371,913

(22) Filed: Apr. 1, 2019

(51) Int. Cl.
| | | |
|---|---|---|
| *H04N 13/117* | (2018.01) | |
| *F41G 7/00* | (2006.01) | |
| *F41G 7/30* | (2006.01) | |
| *H04N 13/194* | (2018.01) | |
| *F41G 7/22* | (2006.01) | |
| *G06F 13/38* | (2006.01) | |
| *G06F 3/12* | (2006.01) | |

(52) U.S. Cl.
CPC .......... *H04N 13/117* (2018.05); *F41G 7/002* (2013.01); *F41G 7/008* (2013.01); *F41G 7/2233* (2013.01); *F41G 7/30* (2013.01); *G06F 3/1208* (2013.01); *G06F 13/38* (2013.01); *H04N 13/194* (2018.05)

(58) Field of Classification Search
CPC .............................. H04N 13/194; F41G 7/002
USPC ........................................................ 345/419
See application file for complete search history.

(56) References Cited

U.S. PATENT DOCUMENTS

| | | |
|---|---|---|
| 4,925,129 A | 5/1990 | Salkeld et al. |
| 7,494,089 B2 | 2/2009 | Williams et al. |
| 7,494,090 B2 | 2/2009 | Leal et al. |
| 2008/0112594 A1* | 5/2008 | Williams ................ F41G 7/007 382/107 |
| 2009/0001214 A1* | 1/2009 | Williams .................. F41G 3/04 244/3.15 |

OTHER PUBLICATIONS

Abraham et al., "Ultra Low Surface Brightness Imaging with the Dragonfly Telephoto Array," astro-ph.IM, Jan. 21, 2014.

* cited by examiner

*Primary Examiner* — Shivang I Patel
(74) *Attorney, Agent, or Firm* — Eric A. Gifford (57) ABSTRACT

An MKV interceptor includes a carrier vehicle (CV) that supports the deployment of M kill vehicles (KVs) and provides centralized acquisition and discrimination pre-ejection. Pre-ejection each KV acquires and transmits IR imagery, and possibly visible imagery, via an internal communication bus to a central processor on the CV. The central processor spatially registers the IR images from the different KVs, either directly from the IR images themselves or using the visible imagery, and sums the IR (and visible) images to form a registered spatially averaged IR image. This image has the same resolution but higher SNR than any one of the KV IR images. The central processor uses this registered spatially averaged image during pre-ejection acquisition and discrimination modes. The key benefit is the elimination of independent CV "sense capability", which is large, heavy and expensive, and was required by either the "command guided" or "sharing" concepts.

20 Claims, 8 Drawing Sheets

MULTIPLE KILL VEHICLE (MKV) INTERCEPTOR WITH IMPROVED PRE-EJECTION ACQUISITION AND DISCRIMINATION

BACKGROUND OF THE INVENTION

Field of the Invention

This invention relates to missile defense systems, and in particular, but not exclusively, to a system for intercepting and destroying exo-atmospheric missiles using kinetic energy kill vehicles, and more particularly to improving the pre-ejection acquisition and discrimination of targets for a multiple KV interceptor.

Description of the Related Art

Ballistic missiles armed with conventional explosives, chemical, biological or nuclear warheads represent a real and growing threat to the United States from the former Soviet Union, North Korea, terrorist states and terrorist groups. The technologies required to both create weapons of mass destruction (WMD) and to deliver them over hundreds to thousands of miles are available and being aggressively sought by enemies of the United States.

Several modern missile defense systems are under development by branches of the US Armed Services and Department of Defense. These systems use a (interceptor) missile to destroy an incoming (target) missile, warhead, reentry vehicle, etc. Blast-fragmentation systems detonate high power explosives shortly before the collision of the interceptor with the target. Kinetic energy systems rely solely on the kinetic energy of the interceptor to destroy the target. Both systems require highly sophisticated guidance systems to acquire, discriminate and track the target. In particular, kinetic energy systems must hit the target with great precision.

Raytheon's EKV (Exo-Atmospheric Kill Vehicle) system represents state-of-the-art in kinetic energy systems designed to locate, track and collide with a ballistic missile. The EKV is a unitary interceptor that includes a single kill vehicle (KV). The interceptor is launched on a multi-stage rocket booster. Current versions of the kill vehicle have optical sensors to support the endgame functions including: acquisition of the target complex, resolution of the objects, discrimination of the target objects, tracking the credible objects, and homing in on the target warhead.

The deployment of missiles with Multiple Independently Targeted Re-entry Vehicles (MIRVs) is driving a move to develop interceptors that can deploy multiple kill vehicles. A multiple kill vehicle (MKV) interceptor would include a carrier vehicle (CV) aka an "adapter" and multiple KVs. The development of an MKV interceptor presents unique problems of weight, miniaturization, cost and control bandwidth to acquire, discriminate, track and intercept multiple targets in addition to all the issues encountered by unitary interceptors. Consequently, an effective MKV interceptor has not yet been deployed.

One concept being pursued is to simply "miniaturize" existing unitary interceptors such as the EKV. In this approach, each KV includes all of the intelligence needed to acquire and discriminate targets and provide guidance to impact. The CV is merely a bus to transport the KVs from launch to release. Unfortunately, the ability to "miniaturize" all the functionality into a small, lightweight KV is well beyond state-of-the-art and may never be realizable due to fundamental physics constraints.

Another concept is to "command guide" all of the KVs from the CV to impact. In this approach all of the optical sense capability and intelligence needed to acquire and discriminate targets and provide guidance to impact is located on the CV. The KVs include minimal functionality, typically only a receiver and actuators/divert thrusts to respond to the heading commands sent by the CV. U.S. Pat. No. 4,925,129 describes a missile defense system including a guided projectile including multiple sub-projectiles. A radar tracker is used to guide the projectile toward a target at relatively large distances. An optical tracker on the projectile is used to track the target at relatively small distances and issue guidance commands to guide the sub-projectiles to intercept the target. Although conceptually attractive, command guidance suffers from poor target resolution at terminal guidance and latency associated with the stand-off range of the CV to keep all targets within the optical tracker's field of regard, which makes aim point selection and terminal guidance imprecise. Recent studies have shown precise aim point selection and terminal guidance to strike the aim point are critical to the success of kinetic energy systems. Furthermore, the CV must have sufficient bandwidth to track all of the targets simultaneously.

Another concept disclosed in U.S. Pat. No. 7,494,089 is to "share" tasks between the CV and the multiple KVs. The placement of "sense capability" in the form of an acquisition and discrimination sensor and control sensor on the CV to provide target acquisition and discrimination and mid-course guidance for all the KVs avoids the weight and complexity issues associated with trying to "miniaturize" unitary interceptors. The placement of a short-band imaging sensor on each KV overcomes the latency, resolution and bandwidth problems associated with command guidance systems and allows each KV to precisely select a desirable aim point and maintain track on that aim point to impact.

Figure 1:
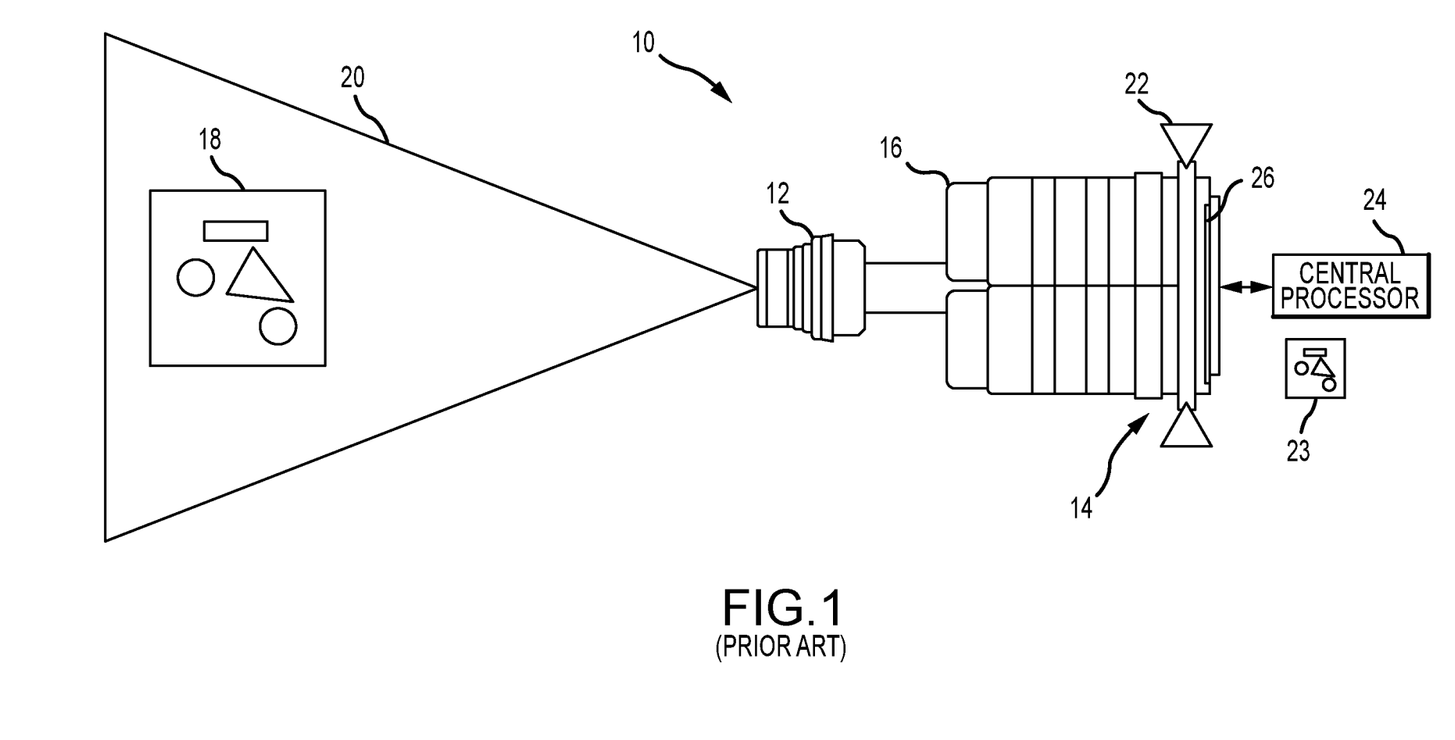
FIG. 1, as shown above, is a simplified diagram of an MKV interceptor sans booster stage including a carrier vehicle (CV) with independent sense capability and a plurality of KVs in which pre-ejection acquisition and discrimination is performed on the CV and supported by the CV's sense capability.

An embodiment of this type of MKV interceptor 10 is illustrated in FIG. 1 in which an optical seeker 12 is mounted on bore sight of a CV 14 with a plurality of KVs 16 mounted peripherally around the seeker 12 with their optical axes nominally aligned parallel to bore sight. In this embodiment the optical seeker 12 is fixed and forward-looking to capture IR imagery 18 within a field-of-view (FOV) 20. In the '089 patent, the seeker was gimbaled. The CV also includes a divert and attitude control system (DACS) 22 to provide divert capability (propulsion) and attitude control of the CV. The optical seeker 12 includes a telescope, multiple optical elements and an IR sensor, which together provide "sense capability." A typical CV optical seeker may have an aperture of 15 to 18 inches in diameter. The optical aperture for a single KV may be about 9 inches in diameter or roughly one-half the size of the CV aperture. Thus the CV optical seeker provides a higher resolution, higher SNR image than any individual KV for pre-ejection acquisition and discrimination but is larger, heavier and significantly more expensive. Optical seeker 12 captures IR images 23, which are passed to a central processor 24 on the CV that processes the IR images to support acquisition and discrimination modes. Pre-ejection (of the KVs from the CV), the central processor 24 controls electrical data, logical discretes and power that are provided to the KVs via an internal communication bus 26. The KVs may transmit status info via the internal communication bus 26 back to the central processor.

Another concept disclosed in U.S. Pat. No. 7,494,090 provides a MKV interceptor including multiple kill vehicles with autonomous management capability and kinematic reach to prosecute a large threat extent. Each KV can self-manage its own KV deployment and target engagement for a determined target volume assigned by a designated master KV. At least one KV is master capable of managing the post-separation of all of the KVs without requiring updates to the mission plan post-separation. The autonomous capability and increased kinematic reach provides for a more efficient use of boosters and more effective engagement of the threat. The CV does not include propulsion, attitude control or sense capability.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention explores yet another concept for a MKV interceptor to address the unique problems of weight, miniaturization, cost and control bandwidth to acquire, discriminate, track and intercept multiple targets in addition to all the issues encountered by unitary interceptors. This approach also shares tasks between the CV and the multiple KVs pre-ejection. Each KV acquires and transmits IR imagery, and possibly visible imagery, via an internal communication bus to a central processor on the CV. The central processor spatially registers the IR images from the different KVs, either directly from the IR images themselves or using the visible imagery, and sums the IR (and visible) images to form a registered spatially averaged image. This image has the same resolution but higher SNR than any one of the KV IR images. The central processor uses this registered spatially averaged image during pre-ejection acquisition and discrimination modes. The key benefit is the elimination of the independent CV "sense capability", which is large, heavy and expensive, and was required by either the "command guided" or "sharing" concepts.

These and other features and advantages of the invention will be apparent to those skilled in the art from the following detailed description of preferred embodiments, taken together with the accompanying drawings, in which:

DETAILED DESCRIPTION OF THE INVENTION

Previous techniques to solve the MKV problem such as "command guided" or "sharing" attempted to overcome the issues of miniaturizing the individual KVs while retaining the required sense capabilities by centralizing higher performing optics and sensors for acquisition and discrimination tasks on the CV. The theory being that a single higher performing optical seeker on the CV could support all M KVs during the early stage acquisition and discrimination modes and possibly through terminal guidance. However, the size, weight and cost of this larger optical seeker as well as other issues such as communication latency have proven to be problematic. The present invention overcomes this particular limitation of providing the CV with independent "sense capability", by eliminating the CV sense capability, while pre-serving the centralized pre-ejection sensing, processing and control during acquisition and discrimination modes. This is accomplished by transmitting the IR (and visible) imagery from each KV via an internal communication bus to the CV where the IR (and visible) imagery is registered and spatially averaging to provide a registered spatially averaged image as a blend of available IR and visible imagery having a higher SNR than any individual KV. This image has sufficient resolution and SNR to support pre-ejection acquisition and discrimination.

The MKV interceptor is a very complex system including much functionality outside the scope of the invention. Consequently, the diagrams and descriptions of the CV, KVs and methods of discrimination, acquisition and guidance are limited to the subject matter of the present invention for purposes of clarity and brevity. Other functionality is well known to those skilled in the art of missile defense systems using kinetic energy interceptors.

Figure 2:
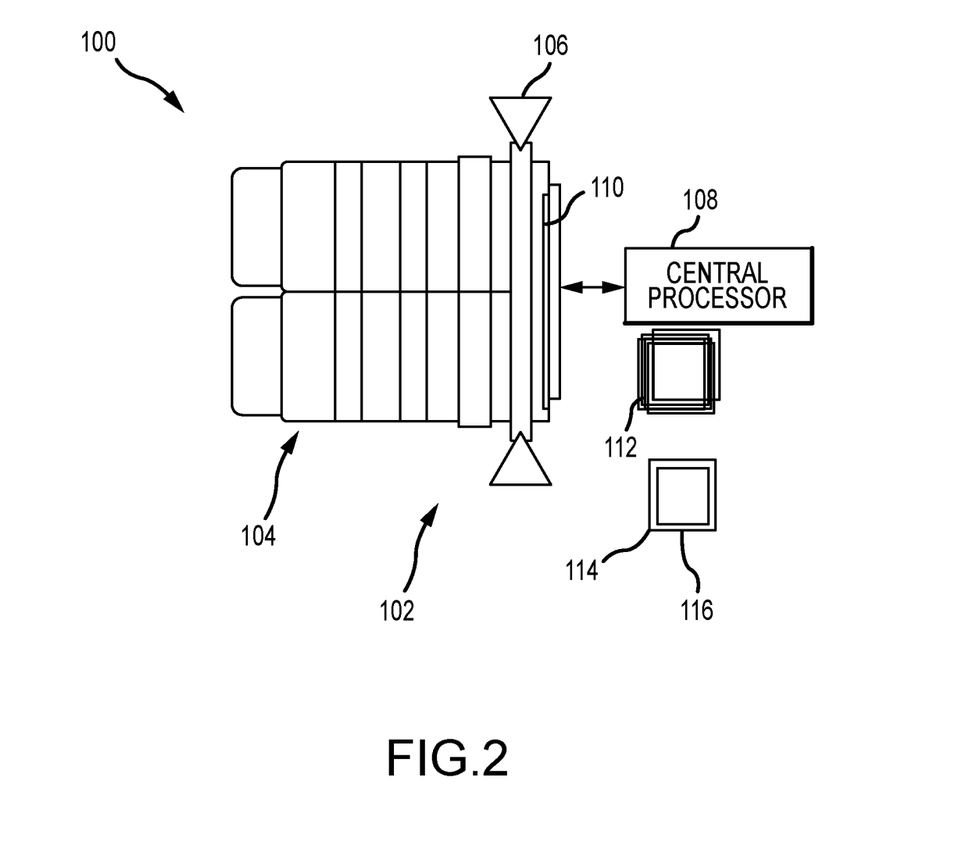
FIG. 2 is a simplified diagram of an MKV interceptor in which the IR (and visible) images from the individual KVs are transmitted to the CV, registered and summed to form a higher SNR image to improve acquisition and discrimination without providing a separate CV sense capability.

As shown in FIG. 2, in an embodiment an MKV interceptor 100 includes a carrier vehicle (CV) 102 and a plurality (M) of KVs 104 initially stored in the carrier vehicle. The number of KVs M may, for example, be between 3 and 25 depending on the mission. For earth-based systems, the interceptor is launched using a multi-stage booster. A kick stage divert separates the interceptor from the last stage of the booster and maneuvers the interceptor onto a nominal intercept trajectory. The kick stage may include axial and lateral divert capability through the center of gravity of the interceptor. An attitude control system includes multiple thrusters 106 offset from the center of gravity that provide yaw, pitch and roll control. Tanks provide the propellant for ACS thrusters and an optional mission-dependent divert stage. Once the interceptor exits the earth's atmosphere a shroud (not shown) that protects the interceptor from contamination, aerodynamic pressure and heating during launch is jettisoned. An external communication link is used to communicate with any source outside the interceptor. An Inertial Measurement Unit (IMU) measures lateral accelerations and angular rates that are fed to a central processor 108 to calculate the CV's position and attitude after a star fix initialization. The KVs are stored in and then released (ejected) from the CV by a KV retention and release mechanism. The CV 102 does not include any independent "sense capability".

Pre-ejection the KVs 104 and the central processor 108 exchange considerable information including the health and status of each KV, targeting information from external sources etc. via a CV internal communication bus 110. In accordance with the present invention, pre-ejection each of the M KVs 104 acquires and transmits IR imagery, and possibly visible imagery, via internal communication bus 110 to central processor 108 on the CV. The central processor spatially registers the IR (and visible) images 112 from the different KVs, either directly from the IR images themselves or in combination with the visible imagery if available, and sums the IR (and visible) images to form a registered spatially averaged image 114 as a blend of the available IR and visible imagery in a reduced common FOV 116. This image 114 has the same resolution but higher SNR than any one of the KV IR or visible images. Given M participating KVs, the SNR of composite image is M times SNR of any one KV image. The central processor uses this higher SNR image during pre-ejection acquisition and discrimination modes. The key benefit is the elimination of the independent CV "sense capability", which is large, heavy and expensive, and was required by either the "command guided" or "sharing" concepts.

What constitutes the "M" KVs that acquire imagery and transmit that imagery to the CV pre-ejection will depend on how the KVs are mounted on the CV. As shown in FIG. 2, all of the M KVs are mounted in a single ring around the CV. In this configuration each of the M KVs have a clear FOV. In other configurations, M KVs may be mounted in each of multiple rings of equal diameter around the CV. Pre-ejection only the M KVs in the forwardmost ring have a clear FOV. In other configurations, the rings may increase in diameter and be terraced front to back so that all of the KVs have a clear or only partially occluded FOV. The greater the number of KVs that can be utilized to form the registered spatially averaged image, the greater the SNR improvement.

Figure 3A:
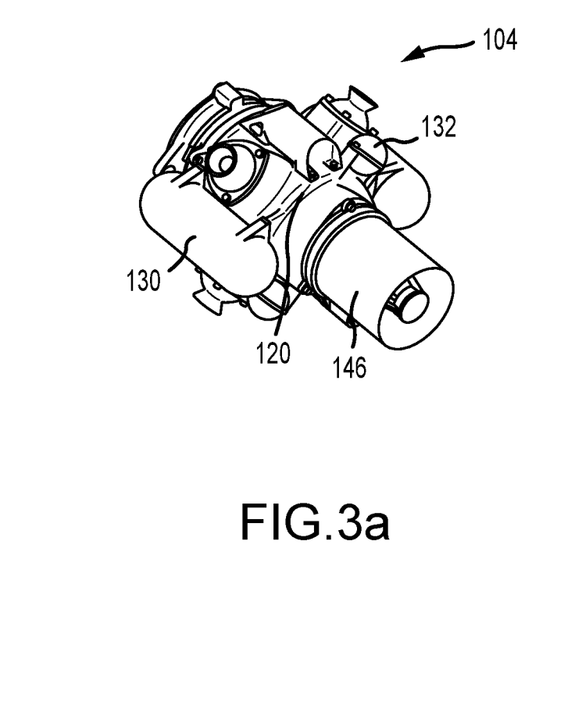
FIGS. 3a and 3b are a perspective view of an embodiment of a KV and a partially cut-away view and simplified schematic diagram of the KV including co-axial visible and IR sensors.
Figure 3B:
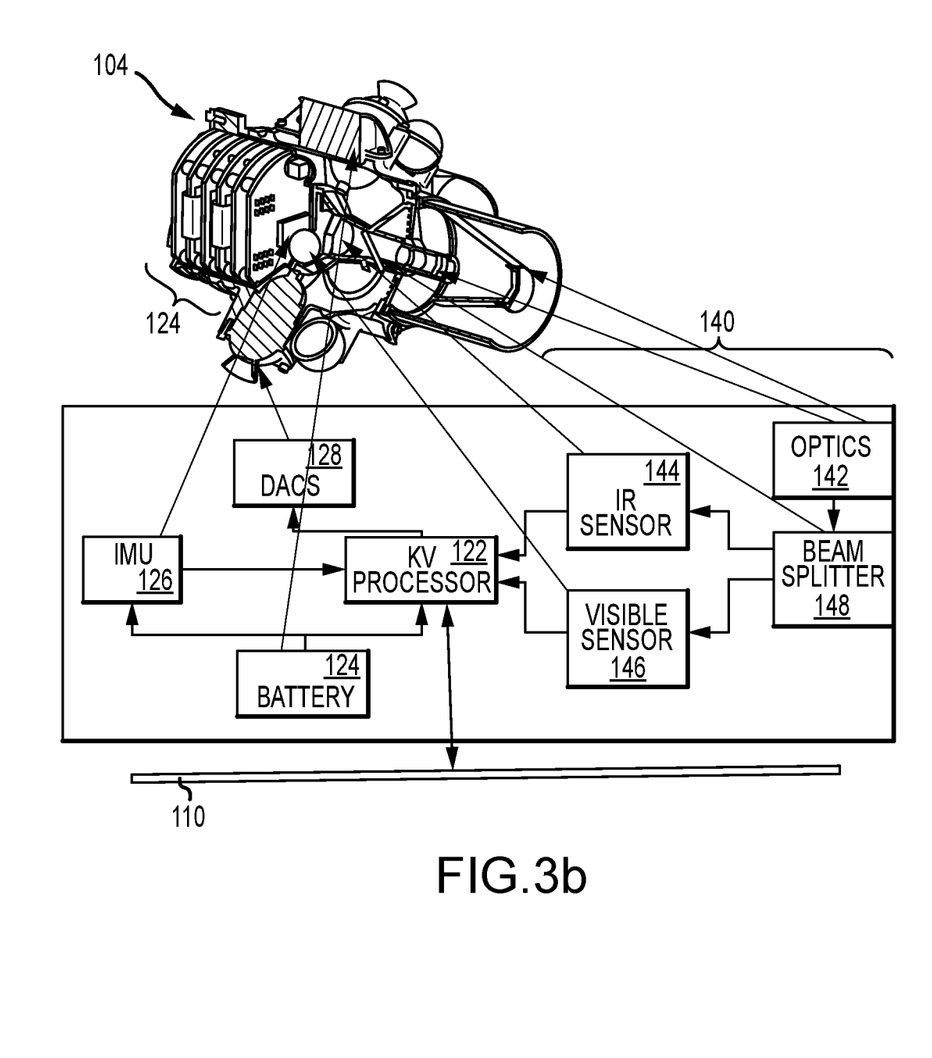

As shown in FIGS. 3a and 3b, an exemplary KV 104 includes a chassis 120 on which is mounted a KV processor 122 as part of avionics electronics 124 for controlling the KV and receiving data from the CV via the internal communication bus 110. A battery 124 supplies electrical power to the KV. An IMU 126 measures lateral accelerations and angular rates that are fed to the processor 122 to calculate the KV's position and attitude after a star fix initialization post-ejection. A divert & attitude control system (DACS) 128 is responsive to commands from KV processor 122 to adjust the heading of the KV to an updated target track. Fuel tanks 130 fuel the DACS thrusters and fuel pressurant 132 maintains the pressure inside the fuel tanks. Each KV is relatively small, typically about one foot long and lightweight in some cases as little as 2 kg. But at very high closing velocities, the KV possesses considerable kinetic energy, enough to kill incoming warheads.

Each KV includes "sense capability" 140 to support both pre-ejection acquisition and discrimination modes centralized on the CV and post-ejection discrimination, tracking and terminal guidance independently on each KV. This sense capability includes at least multi-component optics 142 configured to collect and focus light and an IR sensor 144 positioned at the IR focal plane to generate a sequence of IR images. The imaging sensor is shielded from stray sunlight by a sun shade 146. The IR sensor is suitably a longwave IR (LWIR) sensor having a relatively large FOV for passive detection. The sensor has a suitably large aperture to provide both the sensitivity and resolution required in a diffraction-limited system. Alternately, the IR sensor maybe be a shortwave IR (SWIR) sensor. LWIR is typically considered to be in the range of 8 to 15 microns while SWIR is typically considered to be in the range of 1.4 to 3 microns.

To support registering the KV imagery on the CV, each KV optionally includes a visible sensor 148 positioned at the visible focal plane to generate a sequence of visible images with a FOV. The visible band is typically in a range of 380 to 740 nanometers. A beam splitter 150 separates the incident photons by wavelength e.g., LWIR and visible and routes them to the appropriate sensors. The IR and visible FOV may or may not be the same depending on the position of the respective focal planes, sizes of the respective sensors and any additional optics positioned after the beam splitter. The IR (e.g., LWIR or SWIR) and possibly the visible imagery as available is provided to the KV processor 122 to generate commands for DACS 128. Post-ejection the additional visible sensor may be used if sufficient illumination is available. The IR imagery and visible imagery if available is also routed off the KV to internal communication bus 110 and to the central processor on the CV where it is used to register and sum the IR and visible imagery to form the registered spatially averaged image for pre-ejection acquisition and discrimination processing. Pre-ejection the IR and visible sensors are used to look at either the stars (pre-acquisition) or a target package (discrimination) to extract registration information.

The IR and visible sensors on the KVs have both an "offset" and a "slope" to their response curves. The values of the offset and slope lie within a specified tolerance. The images may be registered and summed based on the assumption that the offset/slope values for all of the M KVs are equivalent and achieve significant SNR gains. Alternately, the offset/slope values may be measured, normalized and calibrated to provide near optimal performance.

As stated the primary benefit afforded the invention is the elimination of the independent sense capability on the CV, which saves space, weight and expense. Secondarily, the CV and multiple KVs utilized in previous versions of the MKV interceptor may be utilized with minimal or no hardware changes if desired. The existing KVs can be used "as is" or modified to include the visible sensor. The existing CV provides the internal communication bus, central processing and ACS. The void left by removing the additional sense capability may be filled by one or more KVs although doing so will require some modifications of the release mechanism. Another benefit of the electronic registration of the images from the different KVs is that the KVs can be mounted to the CV without the difficulty and expense associated with a precision alignment.

An exemplary embodiment for intercepting exo-atmospheric targets using the MKV interceptor described above is illustrated in FIGS. 5 through 8 including the stages of (1) launch & pre-release guidance, (2) pre-acquisition, (3) target acquisition, (4) target discrimination, (5) KV release and hand-over and (6) midcourse tracking and terminal guidance.

Launch & Pre-Release Guidance

Figure 4:
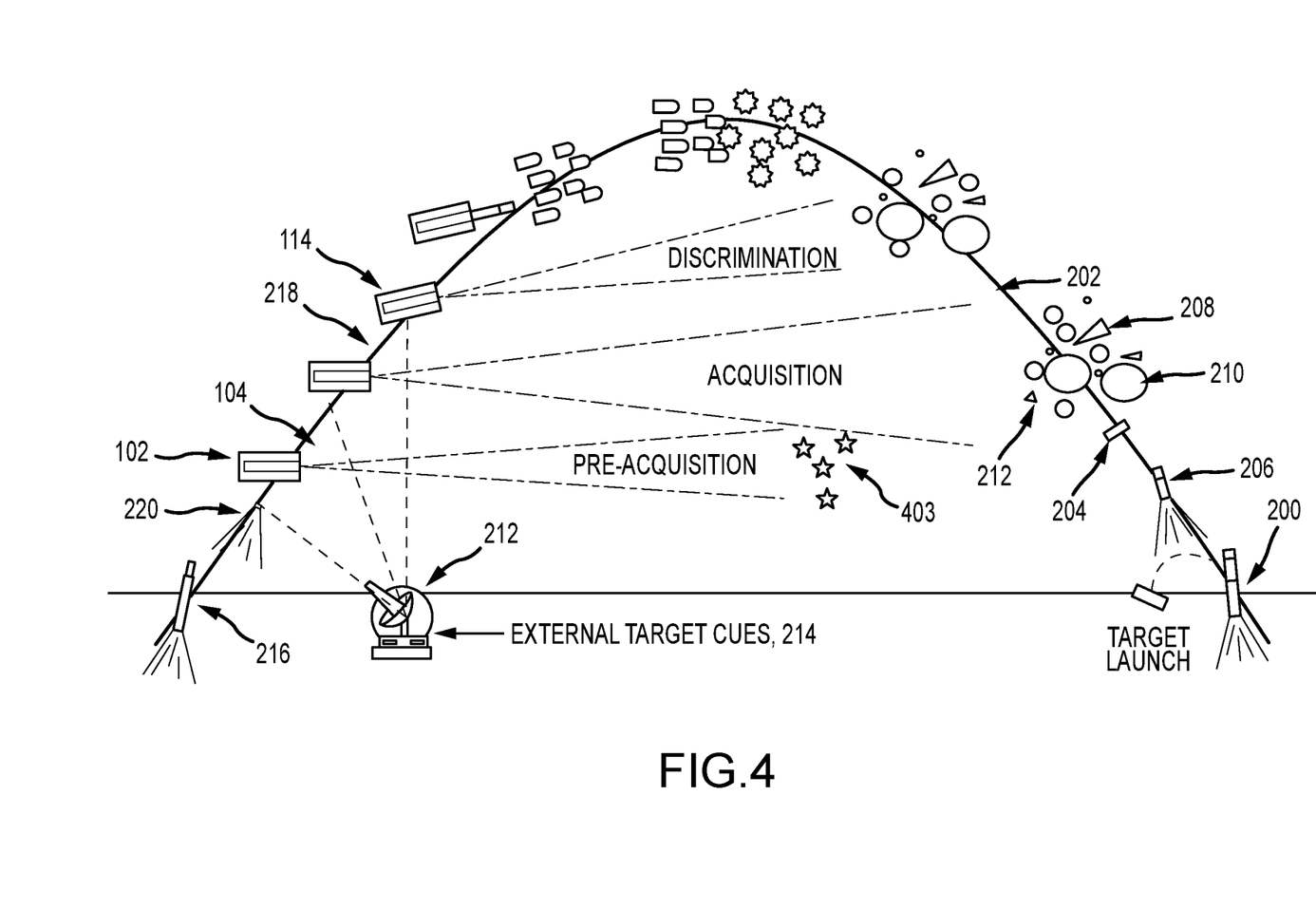
FIG. 4 is a diagram of an MKV interceptor launch to intercept multiple exo-atmospheric targets.

As shown in FIG. 4, a hostile missile 200 is launched on a ballistic trajectory 202 towards a friendly target. The MIRV warhead 204 separates from the boost stage 206 and the multiple RVs (targets) 208 and decoys, chaff, etc. 210 for a target cloud 212 that generally follows the ballistic trajectory. The targets may deviate from this trajectory either unintentionally upon re-entry into the atmosphere or intentionally to defeat a missile defense system.

A missile defense system includes a number of external systems that detect missile launch, assess the threat, and determine external target cues 214 (ballistic trajectory, time to intercept, number of RVs, etc.). The defense system launches one (or more) MKV interceptors 216 along an initial intercept track 218 based on those external target cues. Once aloft, the interceptor drops the booster stage 220 and jettisons the shroud. The interceptor is suitably tracked by a ground based radar installation 212 and engages it's divert and ACS systems to put the interceptor on the initial intercept track.

Pre-Acquisition

Figure 7:
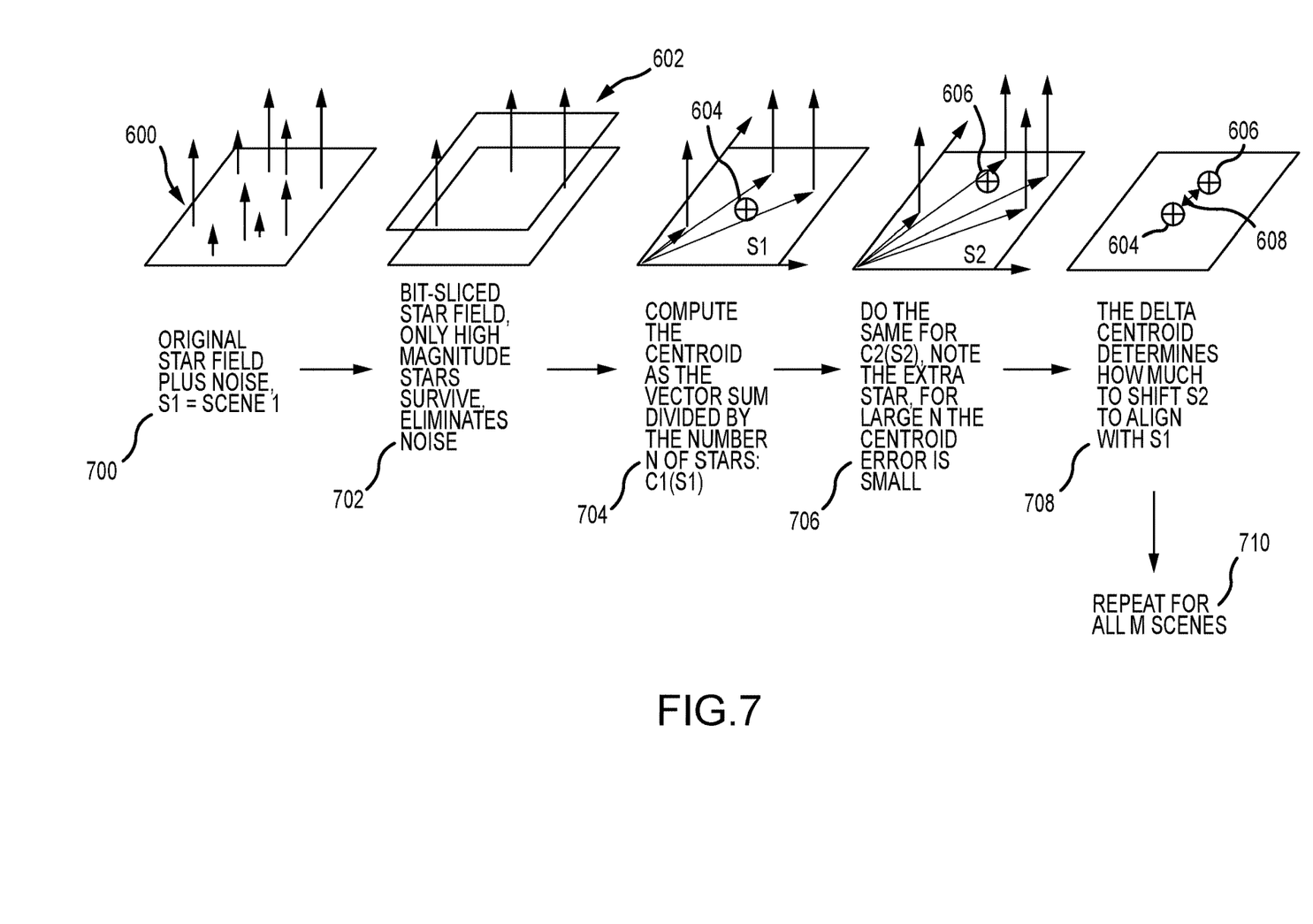

Once the initial intercept track 218 has been established, as shown in FIGS. 4 and 7, the CV 102 commands the M KVs 104 that can see to acquire imagery by taking a start shot 400 in the visible and/or IR bands from each KV of a star field 403 in overlapping but non-registered FOV 401*a*, 401*b* . . . 401*m* (step 300) and transmit that imagery via internal communication bus 110 to the CV's central processor 108 (step 302). In this example, all of the KVs are positioned in a single ring about the CV such that the M KVs are equivalent to all of the KVs and the FOV for the visible and IR sensors are equivalent. The CV's central processor 108 executes an algorithm to register the star shots to provide a registration mapping that relates the FOV of the M KVs (step 304) in a reduced common FOV 402 (step 306). During pre-acquisition, the CV is so far away from the target package that the target package is not visible so the KVs take images of the stars to perform the registration. Typically, the visible imagery will produce more prominent stars then IR imagery but either will typically suffice and only a single star is required.

During pre-acquisition, the registration mapping typically only includes translation in the X and Y direction, not rotation in the XY plane. In a star shot, rotation is generally not apparent. It could be (if the right stars could be selected) but is generally not required. There are only so many good high magnitude stars, and there are more for visible than in the IR. This is the primary reason why the KVs may be configured to include the visible sensor. Although the central processor can generate the registration mapping from only IR imagery or only visible imagery, the richer the data set the more accurate the registration mapping. Therefore if both IR and visible imagery are available, all of the data is preferably acquired and transmitted over the internal communication bus to the central processor.

There are many different algorithms for aligning the star shots to generate the registration mapping. As shown in FIG. 7, a technique is to provide an original star field plus noise, S1=Scene 1 600 (step 700) and bit-slice the star field 602 leaving only high magnitude stars and eliminating noise (step 702). The processor computes the centroid C1 604 as the vector sum divided by the number N of stars: C1(S1) (step 704). The process repeats the process for the next KV and next scene C2(S2) 606 (step 706). Note the extra start. For large N the centroid error is small. The processor computes a delta centroid 608 that determines how much to shift scene S2 to align with S1 (step 708). The processor repeats all steps for all M scenes (KVs) (step 710).

In addition, either the component KV images or the registered spatially averaged image may be averaged temporally over blocks of N frames to further increase SNR. If both temporal and spatial averaging is performed the SNR of the registered spatially averaged image increases by a factor equal to the product of M*N. For efficiency, the component images (IR and/or Visible) may be temporally averaged on-board each KV and the temporally averaged images transmitted via the internal communication bus to the central processor. The downside to temporal averaging is the loss of temporal resolution.

Target Acquisition

Figure 5:
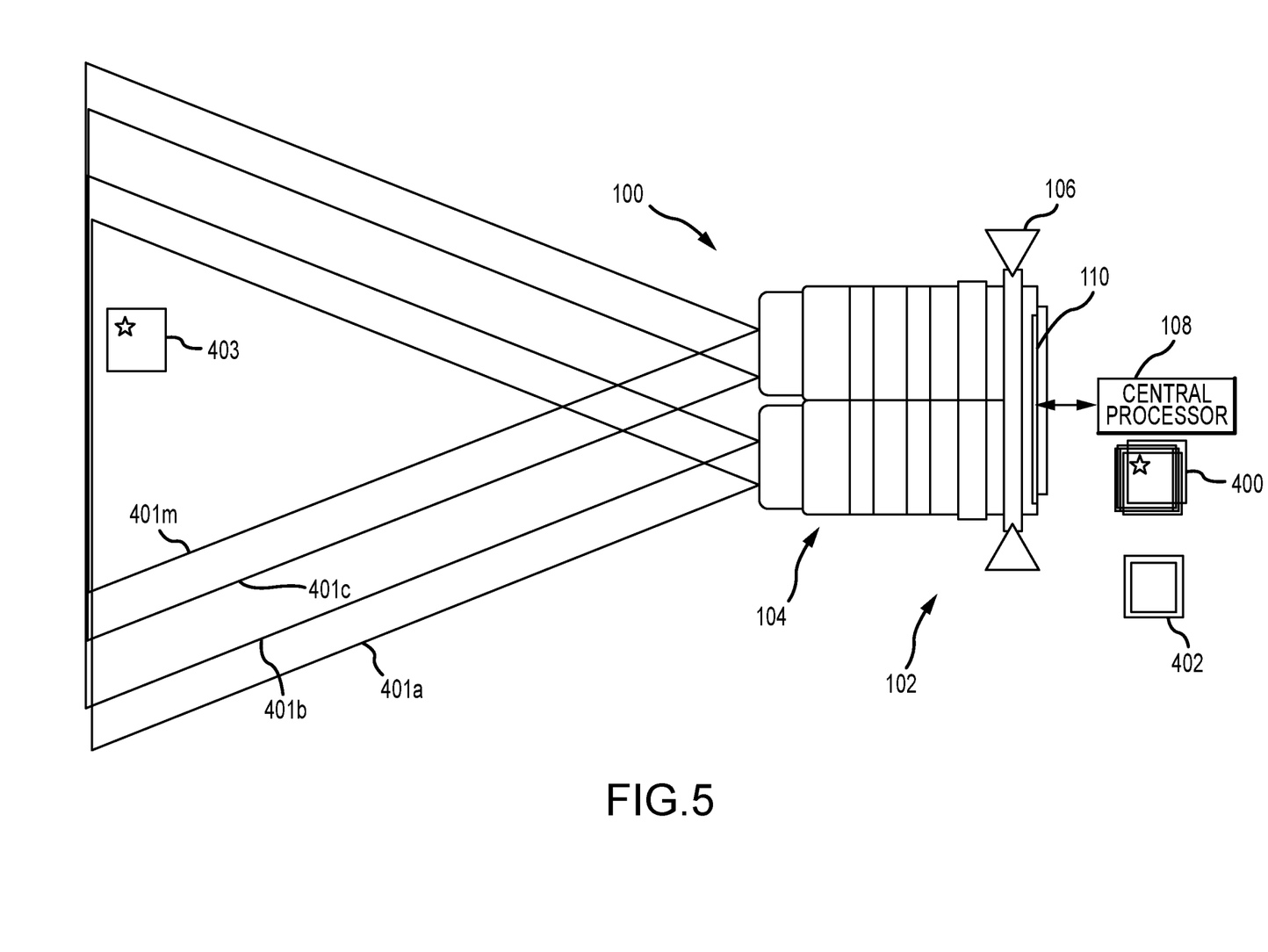
FIG. 5 is a diagram of the MKV interceptor capturing imagery from the multiple KVs in overlapping but misaligned FOV.
Figure 6:
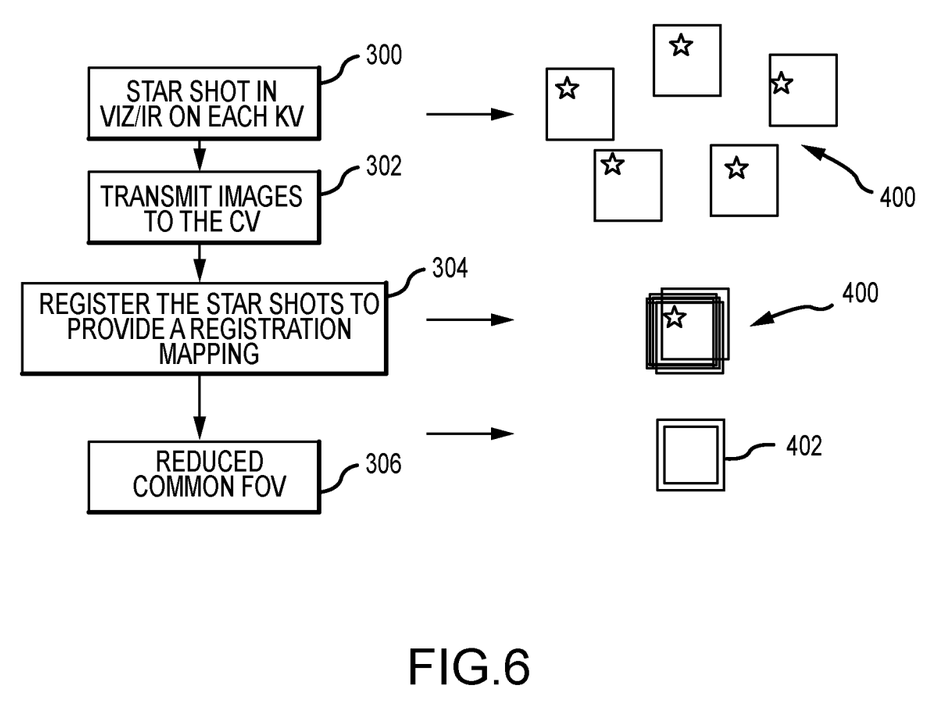
FIGS. 6 and 7 are flow diagrams of an embodiment for registering and summing the IR images from the multiple KVs to form a registered spatially averaged IR image with improved SNR for pre-ejection acquisition and discrimination.
Figure 8:
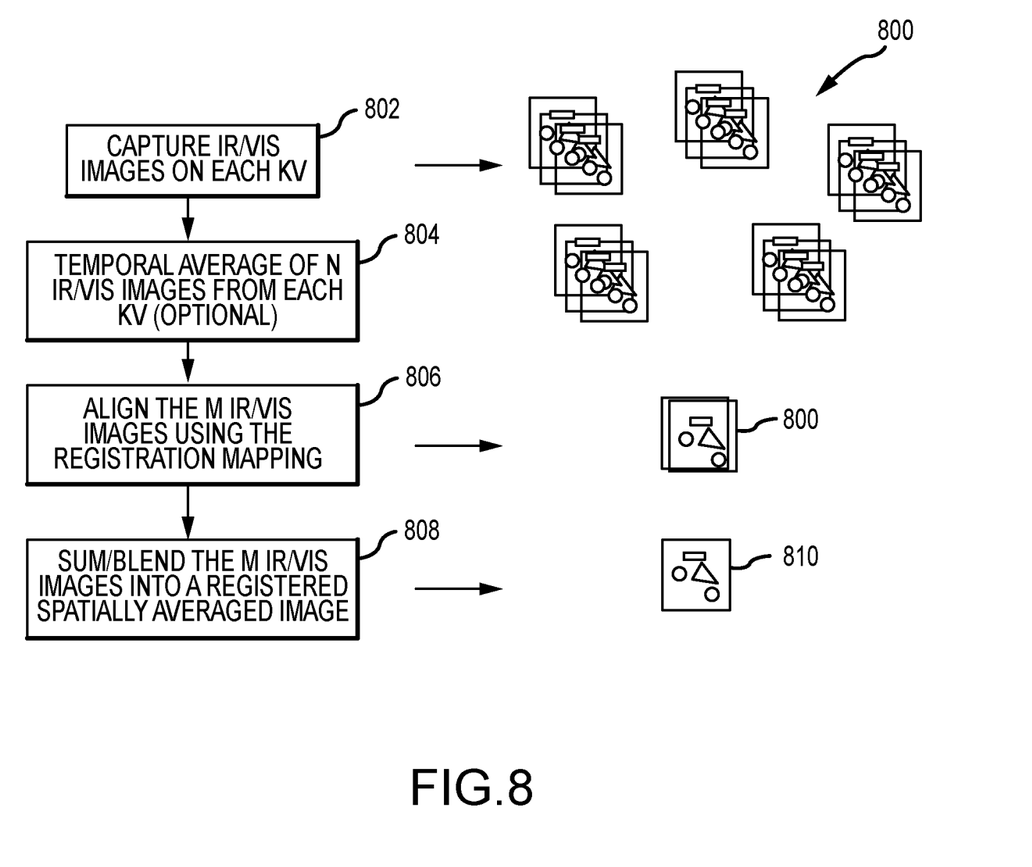
FIG. 8 is a flow diagram of an embodiment for registering either the visible and IR images.

Given the registration mapping for M KVs, as shown in FIGS. 5 and 8 the CV central processor commands the M KVs, which have not been released from the CV, to acquire and transmit imagery 800 within their respective FOV of target cloud 212 via internal communication bus 110 to central processor 108 (step 802). As described above, the KV imagery may be temporally averaged over N frames on-board each KV (step 804). The central processor 108 registers the IR images and visible images as available and sums and blends the images to form the registered spatially averaged image. The central processor aligns the IR and visible images using the registration mapping (step 806) and blends/sums the IR and visible images into a registered spatially averaged image 808 (step 810). The CV acquires the targets within the reduced common FOV and refines the tracking cues. Methods for passive LWIR and visible acquisition of real targets from a target cloud is known in the art and beyond the scope of the present invention. However, the centralization of the acquisition function on the CV without the requirement for independent sense capability greatly simplifies the design (size, weight, cost) of the CV.

Target Discrimination

Once the target cloud 212 and specific targets 208 within the cloud have been acquired, the CV central process may continue to use the pre-acquisition registration mapping to register and sum/blend the available IR and visible imagery from the KVs to form the registered spatially averaged image and execute known methods for discrimination of real targets. Alternately, the CV can use the IR and visible imagery of the target cloud to recomputed the registration mapping. The target cloud may include multiple identifiable objects in far closer proximity to stars. This may allow the central processor to register the images in both translation in the X and Y directions and rotation in the XY plane. In turn this will provide an improved registered spatially averaged image to support discrimination techniques.

KV Ejection and Handover

Once the CV 102 has acquired the target cloud and performed the initial discrimination of real targets 208, as shown in FIG. 4, the CV 102 releases the KVs 104 with initial target designations and intercept trajectories. KVs typically will not all be released at the same time, one ring at a time is preferable. This minimizes the risk of collisions among other benefits. KVs 104 are suitably released with sufficient information to be able to safely divert without risking running into each other or the CV and/or to be able to divert to acquire track towards the target. This knowledge of orientation allows for conventional alignment methods, such as GPS maneuver realignment, that require KV lateral divert before the orientation can be discerned. Alternately, the CV and KVs may be configured using standard umbilical technology and more complex release mechanisms well known in the art to maintain their inertial reference and heading.

Midcourse Tracking and Terminal Guidance

Once released, the individual KVs acquire and process IR imagery and visible imagery if available (e.g., target illuminated by the sun or another external source) to generate guidance commands to intercept the assigned target. At a certain range to target, the KV processes the available imagery to select and aimpoint and perform terminal guidance to impact the target at the selected aimpoint. The addition of the shorter wavelength visible sensor may be particularly useful where precise aimpoint selection is needed to effectively destroy the target upon impact. The visible sensor may be able to resolve multiple independent pixels on target to provide both shape and orientation of the target. By comparison the IR sensors may be able to only resolve sufficient pixels to provide a centroid of the target.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A multiple kill vehicle (MKV) interceptor, comprising:
   a carrier vehicle (CV) including an internal communication bus and a central processor; and
   a plurality M of KVs mounted on the CV such that their field-of-view (FOV) overlap but are not spatially registered and coupled to the internal communication bus, each said KV including an IR sensor mounted to capture IR images in the FOV,
   wherein pre-ejection each KV transmits the IR images via the internal communication bus to said central processor, which spatially registers and sums at least the IR images from the M KVs over a reduced common FOV to form a registered spatially averaged image.

2. The MKV interceptor of claim 1, wherein said carrier vehicle does not include independent sense capability.

3. The MKV interceptor of claim 2, wherein said carrier vehicle includes an attitude control system (ACS), said central processor processing the registered spatially averaged image to generate guidance commands for the ACS to correct the pre-ejection attitude of the CV.

4. The MKV interceptor of claim 1, wherein each said KV is mounted on the CV in nominal alignment to a CV bore sight axis, wherein neither the CV or KVs are adapted for precision alignment to the bore sight axis.

5. The MKV interceptor of claim 1, wherein said central processor processes the IR images to first register and then sum the IR images.

6. The MKV interceptor of claim 1, wherein each said KV further includes a visible sensor mounted coaxially with said IR sensor to capture and transmit visible images via the internal communication bus, wherein said central processor processes the visible images to register the KVs' FOV to create a registration mapping, registers the IR images using the registration mapping and sums the registered IR images.

7. The MKV interceptor of claim 6, wherein the central processor processes both the IR and visible images to register the KVs' FOV to create the registration mapping and sums both the IR and visible images to form the registered spatially averaged image as a blend of both the IR and visible imagery.

8. The MKV interceptor of claim 1, wherein the SNR of the registered spatially averaged image is approximately M times the SNR of any one of the IR images and the resolution of the registered spatially averaged IR image is equivalent to any one of the IR images.

9. The MKV interceptor of claim 1, wherein the IR images for each said KV are temporally averaged.

10. The MKV interceptor of claim 9, wherein the IR images are temporally averaged on-board each said KV to form a temporally averaged IR image that is transmitted on the internal communication bus, wherein the central processor registers and averages the temporally averaged IR images from the plurality of KVs to form the registered spatially averaged image.

11. The MKV interceptor of claim 1, wherein prior to entering an acquisition mode, the central processor processes images of a star field to register the IR images to improve the acquisition range of targets in the reduced common FOV.

12. The MKV interceptor of claim 11, wherein registration of the IR images is limited to translation in the X and Y direction of the images.

13. The MKV interceptor of claim 1, wherein in discrimination mode, the central processor processes images of a target package to register the IR images to improve discrimination of targets in the reduced common FOV.

14. The MKV interceptor of claim 13, wherein registration of the IR images includes both translation in X and Y directions and rotation in an XY plane.

15. A multiple kill vehicle (MKV) interceptor, comprising:
   a carrier vehicle (CV) including an internal communication bus, a central processor and an attitude and control system (ACS) but no independent sense capability; and
   a plurality M of KVs mounted on the CV and coupled to the internal communication bus, each said KV including coaxially mounted IR and visible sensors that capture imagery within a field-of-view (FOV) such that their FOV overlap but are not spatially registered,
   wherein pre-ejection each KV transmits the visible and IR images via the internal communication bus to said central processor, which processes the visible and IR images to register the FOV to create a registration mapping, registers the visible and IR images using the registration mapping and sums and blends the registered IR visible images from the M KVs over a reduced common FOV to form a registered spatially averaged image, wherein said central processor processes the registered spatially averaged image to generate guidance commands for the ACS to correct the pre-ejection attitude of the CV.

16. A method of improving the SNR of an IR image of a target package for a multiple kill vehicle (MKV) interceptor, wherein said MKV interceptor comprises a plurality of M KVs mounted on a carrier vehicle (CV), which includes an internal communication bus and a central processor, such that the KVs' field-of-view (FOV) overlap but are not spatially registered, the method comprising:
   from each said KV, capturing IR images;
   from each said KV, transmitting the IR images via the internal communication bus to the central processor, and
   using the central processor to register and then sum the IR images from the MKVs over a reduced common FOV to form a registered spatially averaged IR image.

17. The method of claim 16, wherein said carrier vehicle does not include independent sense capability.

18. The method of claim 16, wherein said carrier vehicle includes an attitude control system (ACS), further comprising:
   processing the registered spatially averaged image to generate guidance commands for the ACS to correct the pre-ejection attitude of the CV.

19. The method of claim 16, wherein each said KV further includes a visible sensor mounted coaxially with said IR sensor to capture visible images, further comprising:
   from each said KV, transmitting visible images via the internal communication bus to the central processor, using the central process to register to register the FOV to create a registration mapping, register the IR images using the registration mapping and sum the registered IR images to form the registered spatially averaged image.

20. The method of claim 16, wherein both visible and IR images are transmitted, processed to create the registration mapping and summed to form the registered spatially averaged image as a blend of both the IR and visible imagery.

* * * * *

UNITED STATES PATENT AND TRADEMARK OFFICE
CERTIFICATE OF CORRECTION

PATENT NO.         : 10,715,781 B1
APPLICATION NO.    : 16/371913
DATED              : July 14, 2020
INVENTOR(S)        : Bielas et al.

It is certified that error appears in the above-identified patent and that said Letters Patent is hereby corrected as shown below:

In the Specification

In Column 6, Line 9, delete "148" and insert --146-- therefor

In Column 6, Line 12, delete "150" and insert --148-- therefor

In Column 9, Line 8, after "target", insert --.--

Signed and Sealed this
Second Day of February, 2021

Drew Hirshfeld
*Performing the Functions and Duties of the
Under Secretary of Commerce for Intellectual Property and
Director of the United States Patent and Trademark Office*